(12) United States Patent
Lee et al.

(10) Patent No.: US 9,151,962 B2
(45) Date of Patent: Oct. 6, 2015

(54) POSITION DETECTOR AND AUTOFOCUS CONTROL APPARATUS USING FOCAL POINT DEVIATION DETECTOR

(71) Applicant: Samsung Electronics Co., Ltd., Suwon-Si, Gyeonggi-Do (KR)

(72) Inventors: Hyun Jae Lee, Suncheon-si (KR); Myoung Ki Ahn, Yongin-si (KR); Kwang Soo Kim, Suwon-si (KR); In Ho Seo, Daejeon (KR); Chang Hoon Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 184 days.

(21) Appl. No.: 13/773,736

(22) Filed: Feb. 22, 2013

(65) Prior Publication Data

US 2013/0214121 A1    Aug. 22, 2013

(30) Foreign Application Priority Data

Feb. 22, 2012 (KR) ........................ 10-2012-0018092

(51) Int. Cl.
*G02B 27/40*    (2006.01)
*G02B 7/38*    (2006.01)
*G02B 3/10*    (2006.01)

(52) U.S. Cl.
CPC *G02B 27/40* (2013.01); *G02B 3/10* (2013.01); *G02B 7/38* (2013.01)

(58) Field of Classification Search
CPC .. H04N 5/23212; G03F 9/7026; G02B 27/40; G02B 7/04; G02B 7/09; G02B 21/241–21/247; G11B 7/0909; G03B 13/36; G03B 3/10
USPC ............. 250/201.2–201.4; 359/383; 348/345, 348/349, 353; 396/77, 82
See application file for complete search history.

(56) References Cited

PUBLICATIONS

Leeghim, Henzeh, MyoungKi Ahn, and Kwangsoo Kim. "Novel Approah to Optical Profiler with Gradient Focal Point Methods." Optics Express 20.21 (2012): 23061-3073. Print.*

\* cited by examiner

*Primary Examiner* — Georgia Y Epps
*Assistant Examiner* — Carolynn A Moore
(74) *Attorney, Agent, or Firm* — Harness, Dickey & Pierce

(57) ABSTRACT

An autofocus control apparatus includes a beam splitter, a condenser lens and a detector. The beam splitter directs light beams from a light source toward a sample and passes light beams reflected from the sample to the condenser lens. The condenser lens condenses the light beams, and the detector detects a focal point deviation of the sample relative to a focal point of the condenser lens. The focal point deviation is detected based on an intersection of a focal line passing through different focal points of the condenser lens and a light receiving plane configured to receive the light beams passing through the condenser lens.

20 Claims, 12 Drawing Sheets

POSITION DETECTOR AND AUTOFOCUS CONTROL APPARATUS USING FOCAL POINT DEVIATION DETECTOR

CROSS-REFERENCE TO RELATED APPLICATION

This application claims the benefit of Korean Patent Application No. 2012-0018092, filed on Feb. 22, 2012 in the Korean Intellectual Property Office, the disclosure of which is incorporated herein by reference in its entirety.

BACKGROUND

1. Field

One or more embodiments of the present disclosure relate to an autofocus control apparatus.

2. Description of the Related Art

An imaging system employs an autofocus control apparatus to drive a lens in order to allow light to be automatically focused on a stationary image forming plane. Such an autofocus control apparatus may be used to automatically focus light on a surface of an object to be observed and therefore is often found in processing/inspection equipment using a microscope system or other similar optical systems. Accuracy and speed of autofocus control are factors to determine performance of the equipment and thus the quality of products produced by this equipment on a production line.

Examples of methods for performing autofocus control include a positive autofocus control method and a passive autofocus control method.

In the positive autofocus control method, after light beams, reflected at different heights from a focal plane of an objective lens, pass through the objective lens, a focal point of the light beams may vary via a condenser lens located immediately in front of light receiving parts. In this case, the light receiving parts may be located respectively at two positions A and B equidistantly spaced forward and rearward on the basis of a focal point forming location. If the same intensity of light reaches the respective light receiving parts, it may be determined that a sample is at a focal distance.

On the other hand, it may be determined that the sample is located less than the focal distance if the intensity of light measured by the light receiving part at the position A is greater than that at the position B, and that the sample is located beyond the focal distance if the intensity of light at the position A is less than that at the position B. A focal point is recognized based on the above-described principle, and in turn autofocus control is performed based on the recognized focal point.

This method may exhibit relatively fast response time, but relatively low accuracy. In particular, in the case in which a sample is a thin transparent layer, accuracy may be deteriorated due to focal point ambiguity of an objective lens having a particular magnification. This is caused because both beams reflected from upper and lower surfaces of the transparent object are introduced into a light receiving part and a condenser lens focuses the beams at similar positions.

The passive autofocus control method attains images of a sample using an image sensor while moving an objective lens, which is randomly spaced apart from a sample by a predetermined distance on the basis of a reference position. The definitions of several images are then calculated based on a moved position of the objective lens. A position showing the greatest image definition is a focal point of the sample.

Thus, in this passive method, an object to be observed is completely focused when the objective lens is moved from the reference position to the position showing the greatest image definition. This method may accurately find a focal point, but requires a large time to attain and analyze the several images while moving the objective lens by the predetermined distance to find a focal point.

SUMMARY

In accordance with one or more embodiments, an autofocus control apparatus is provided that accurately and rapidly detects focal point deviation of a sample relative to a focal point of an objective lens.

In accordance with one embodiment, an autofocus control apparatus includes a light source, a beam splitter configured to direct light beams from the light source toward a sample and to pass light beams reflected from the sample; a condenser lens configured to condense the light beams reflected from the sample and passing through the beam splitter; and a focal point deviation detector configured to detect a focal point deviation of the sample relative to a focal point of the condenser lens. The detector configured to detect the focal point deviation based on an intersection of a focal line passing through different focal points of the condenser lens with a light receiving plane configured to receive the light beams passing through the condenser lens. In one embodiment, the focal point deviation detector may include the condenser lens and in another embodiment the detector may be provided separately from the detector.

The focal line of the condenser lens intersects the light receiving plane of the image sensor at an angle different from a right angle.

The condenser lens may have different focal distances corresponding to the different focal points, and a light beam emission face having a linearly varying radius of curvature which causes the focal line of the condenser lens to intersect the light receiving plane.

The condenser lens includes a first section and a second section having different radii of curvature, and a radius of curvature of the condenser lens linearly decreases or increases from the first section to the second section of the condenser lens.

The condenser lens includes a first section and a second section having substantially a same radius of curvature, and a thickness of the condenser lens linearly decreases or increases from the first section to the second section of the condenser lens.

The condenser lens includes a cylinder lens having a substantially constant focal distance, and the cylinder lens is tilted relative to an optical axis to cause the focal line passing through the different focal points of the cylinder lens to intersect the light receiving plane.

The focal point deviation detector includes an image sensor which is tilted at an angle relative to an optical axis, and the angle allows the light receiving plane to intersect the focal line of the condenser lens.

The apparatus further includes a controller configured to generate a beam spot image from image data detected by the focal point deviation detector, the controller configured to determine a degree of the focal point deviation based on the focal point of the condenser and a reference position.

The controller is configured to determine the focal point of the condenser lens based on intensities of light beams in the beam spot image.

The focal point deviation detector includes a stage mover to move a stage supporting the sample, and the controller is configured to control the stage mover to move the stage based on the degree of focal point deviation, the stage mover moving the sample to a position that at least substantially coincides with the focal point of the condenser lens.

In accordance with another embodiment an autofocus control apparatus comprises a light source; a first beam splitter configured to direct light beams from the light source toward a sample and to pass light beams reflected from the sample; a second beam splitter configured to transmit a first portion of the light beams reflected from the sample and passed through the first beam splitter and to reflect a second portion of the light beams; a first condenser lens configured to condense the first portion of the light beams reflected from the sample and passing through the first beam splitter and the second beam splitter; a second condenser lens configured to condense the second portion of the light beams reflected from the sample and passing through the first beam splitter and reflected from the second beam splitter.

Also included is a first focal point deviation detector configured to receive the first portion of the light beams from the first condenser lens and to detect a first focal point deviation of the sample based on an intersection of a first focal line passing through different focal points of a first condenser lens with a first light receiving plane; and a second focal point deviation detector configured to receive the second portion of light beams from the second condenser lens and to detect a second focal point deviation of the sample based on an intersection of a second focal line passing through different focal points of a second condenser lens with a second light receiving plane.

The first focal point deviation detector includes the first condenser lens and the second focal point deviation detector includes the second condenser lens. The first focal line intersects the first light receiving plane at a first angle different from a right angle, and the second focal line intersects the second light receiving plane by a second angle different from a right angle. The first angle and the second angle are substantially equal.

The first condenser lens has different focal distances and includes a light beam emission face having a linearly varying radius of curvature to cause the first focal line to intersect the first light receiving plane.

The second condenser lens has different focal distances and includes a light beam emission face having a linearly varying radius of curvature to cause the second focal line to intersect the second light receiving plane.

The second condenser lens has different focal distances and includes a light beam emission face having a substantially constant radius of curvature to cause the second focal line to intersect the second light receiving plane. The second condenser lens has different thicknesses corresponding to the different focal distances.

The first condenser lens has a first section and a second section with different radii of curvature, and a radius of curvature of the first condenser lens linearly decreases or increases from the first section to the second section.

The second condenser lens has a first section and a second section with different radii of curvature, and a radius of curvature of the second condenser lens linearly decreases or increases from the first section to the second section.

The first condenser lens has a first section and a second section with a substantially constant radius of curvature, and thickness of the first condenser lens linearly decreases or increases from the first section to the second section to produce the different focal points of the first condenser lens.

The second condenser lens has a first section and a second section with a substantially constant radius of curvature, and a thickness of the second condenser lens linearly decreases or increases from the first section to the second section to produce the different focal points of the second condenser lens.

The second condenser lens has a first section and a second section with different radii of curvature, and a radius of curvature of the second condenser lens linearly decreases or increases from the first section to the second section.

At least one of the first condenser lens or the second condenser lens includes a cylinder lens having a substantially constant focal distance, and the cylinder lens or a corresponding one of the first focal point deviation detector or the second focal point deviation detector is tilted relative to an optical axis to cause the first focal line to intersect the first light receiving plane or the second focal line to intersect the second light receiving plane.

In accordance with another embodiment, an apparatus comprises a first lens configured to condense light beams; and a detector configured to detect an intersection between a focal line and a light receiving plane, the first lens including a plurality of focal points of different lengths through which the focal line passes and the detector configured to detect a focal point deviation of an object from which the light beams reflect based on the intersection of the focal line with the light receiving plane.

The first lens has a first section with a first focal point, a second section with a second focal point different from the first focal point, the focal line passing through the first and second focal points slanted to cause the focal line to intersect the light receiving plane at only one point. The first focal point and the second focal point are simultaneously generated on the focal line.

The first lens has a light emitting surface with different radii of curvature, and the different radii of curvature corresponding to respective ones of the different focal points. The first lens has a light emitting surface with a substantially constant radius of curvature, and sections with different thicknesses coupled to the light emitting surface corresponding to respective ones of the different focal points.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF EXAMPLE EMBODIMENTS

Figure 1:
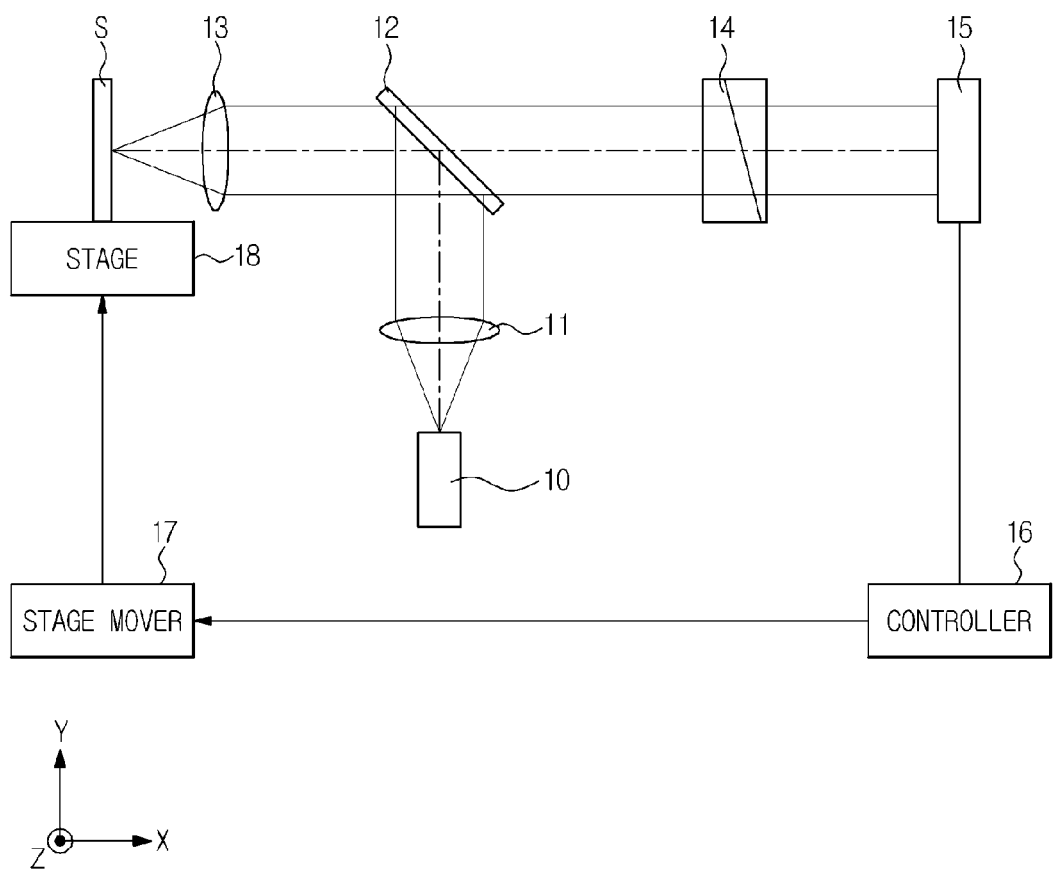
FIG. 1 is a schematic view illustrating one embodiment of a configuration of an autofocus control apparatus.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

In the drawings, it is understood that the thicknesses of layers and regions may be exaggerated for clarity. It will also be understood that when a layer is referred to as being "on" another layer or substrate, it can be directly on the other layer or substrate or intervening layers may also be present. Like reference numerals in the drawings denote like elements, and thus their description will not be repeated. As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

One or more embodiments of an autofocus control apparatus spatially recognizes a focal point via single image capture. Through this single image capture, faster and more accurate focal point estimation may be possible compared to other methods. This may be accomplished according to a variety of embodiments.

Firstly, there is a method of using a lens having a linearly varying focal distance as a condenser lens. An example of such a lens is a Gradient Focal Point (GFP) lens which may have a shape similar to a cylinder lens but which continuously varies in focal distance. Through adoption of this type of lens, light having passed through the lens has a variable focal point on a light receiving part, and therefore a focal point may be found by a high-intensity signal measured at a junction between the focal point and the light receiving part.

Secondly, there is a method of using a lens having a linearly varying center thickness as a condenser lens. A cylinder lens adapted to have a linearly varying thickness provides a linearly varying focal point. Through adoption of this lens, light having passed through the lens has a variable focal point on a light receiving plane of an image sensor, and therefore a focal point may be found by a high-intensity signal measured at a junction between the focal point and the light receiving plane.

Thirdly, there is a method to linearly vary a distance between a condenser lens and a light receiving plane of an image sensor. This method may achieve linear variation of a focal point similar to the aforementioned methods by controlling an angle between the conventional cylindrical condenser lens and the light receiving plane of the image sensor. The focal point may be recognized based on the linear variation characteristics.

These and other embodiments of performing autofocus control may recognize an accurate focal point using only a single measurement and at the same time is able to realize high-speed operation.

FIG. 1 is a schematic view illustrating one embodiment of a configuration of an autofocus control apparatus which includes a light source 10, a field lens 11, a beam splitter 12, an objective lens 13, focal point deviation detectors 14, 15 and 16, a stage mover 17, and a stage 18. In accordance with this embodiment, the focal point deviation detectors 14, 15 and 16 respectively include a condenser lens 14, an image sensor 15, and a controller 16.

The light source 10 is a device that emits laser beams to introduce the laser beams into a surface of a sample S. The light source 10 is adapted to emit a predetermined shape of laser beams by controlling the intensity of light.

The field lens 11 converts the laser beams emitted from the light source 10 into parallel beams to be introduced into the beam splitter 12.

The beam splitter 12 may be, for example, a partially reflective half mirror that functions to reflect a part of incident light and transmit a part of light. In other embodiments, another type of optical member performing the same or similar function may be used instead of a half mirror.

The objective lens 13 directs the laser beams from the beam splitter 12 to the sample S, and also receives beams reflected from the sample S.

The sample S may be arranged to face the objective lens 13. For example, the sample S may be fixed on a stage of an optical system to move in Y-axis and Z-axis along with the stage and in X-axis relative to the objective lens 13. When the surface of the sample S is at a focal point (reference position) of the X-axis, a clear image of the sample surface may be acquired via the image sensor 15. In this case, the focal point varies based on a magnification of the objective lens 13.

The condenser lens 14 is located between the beam splitter 12 and the image sensor 15. The condenser lens 14 has different focal distances such that a focal line connecting the different focal points intersects a light receiving plane of the image sensor 15. In this context, a lens in which focal points are on a line with a gradient is referred to as a Gradient Focal Point (GFP) lens.

The condenser lens 14 condenses the laser beams directed from the beam splitter 12 at different focal points with respect to the image sensor 15.

The image sensor 15 generates image data on a per pixel basis by sensing the laser beams that have been reflected from the surface of the sample S and condensed at different focal points by the condenser lens 14. The image data is synthesized to a single beam spot image by the controller 16.

The controller 16 generates the beam spot image from the image data on a per pixel basis from the image sensor 15, and determines a focal point of the condenser lens 14 based on intensities of the laser beams on the beam spot image by analyzing the generated beam spot image. The controller 16 then compares the determined focal point of the condenser lens 14 with a reference position, to determine whether or not focal point deviation of the sample S relative to a focal point of the objective lens 13 occurs and to determine a focal point deviation degree.

If the focal point deviation occurs (or occurs beyond a threshold or tolerance level), the controller 16 performs autofocus control to correct the focal point by moving the stage 18 via the stage mover 17 to move the sample S to a normal or improved focal point. The stage mover 17 moves stage 18 in response to a control signal of the controller 16.

In the autofocus control apparatus having the above-described configuration, laser beams from the light source 10 are converted into parallel beams while passing through the field lens 11 and are changed in direction by the beam splitter 12 so as to be introduced into the objective lens 13. The laser beams having passed through the objective lens 13 reach the sample S and are reflected by the sample S to objective lens 13. After sequentially passing through the objective lens 13 and the beam splitter 12, the reflected beams are introduced into the condenser lens 14 located behind a rear surface of the beam splitter 12. The beams pass through the condenser lens and are introduced into the image sensor 15 located behind a rear surface of the condenser lens 14. As such, the image sensor 15 may detect an image of the sample S by detecting the laser beams.

In this case, the laser beams having passed through the condenser lens 14 are condensed at different focal points, and a focal line connecting the focal points intersects a light receiving plane of the image sensor 15. The laser beam having a focal point located at the light receiving plane (in the beam spot image sensed by the image sensor 15) has a high intensity, whereas the laser beam having a focal point which is not located (e.g., which is in front of or behind) in the light receiving plane has a low intensity.

As a result of the different locations of the focal points relative to the light receiving plane, the laser beams have different brightnesses on the beam spot image. Accordingly, since a position of the beam spot image where the laser beam has the greatest brightness is the focal point of the sample S, it may be determined whether or not a position of the sample S deviates from the focal point of the objective lens 13 by comparing the greatest brightness position with a reference position.

The focal point on the beam spot image of the image sensor 15 varies based on a distance between the sample S and the objective lens 13 because the focal line connecting the focal points of the condenser lens 14 having different focal distances intersects the light receiving plane of the image sensor 15. Put differently, focal point deviation of the sample relative to a focal point of the condenser lens may be detected based on an intersection of a focal line passing through different focal points of the condenser lens with a light receiving plane configured to receive the light beams passing through the condenser lens.

Hereinafter, an example of a procedure of determining deviation between the sample S and a focal point of the objective lens 13 will be described.

Figure 2:
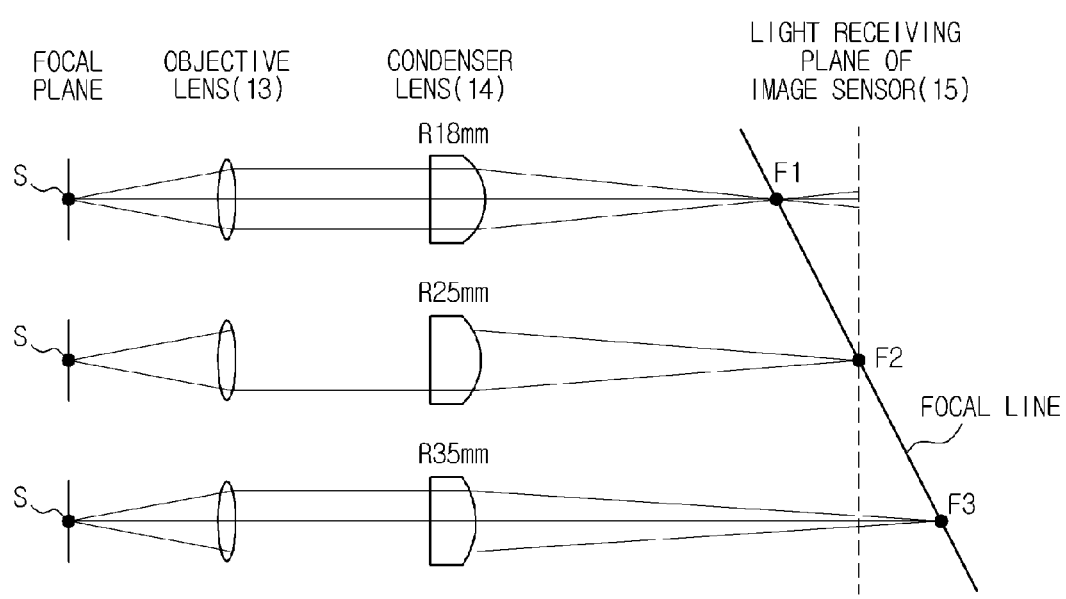
FIG. 2 is a view showing intensities of laser beams directed from three condenser lenses to an image sensor when a sample is located at a focal point of an objective lens in an autofocus control apparatus.

FIG. 2 shows intensities of laser beams directed from three condenser lens sections toward the image sensor when the sample is located at the focal point of the objective lens in an autofocus control apparatus. In this example, the three condenser lens sections have different focal distances.

Figure 3:
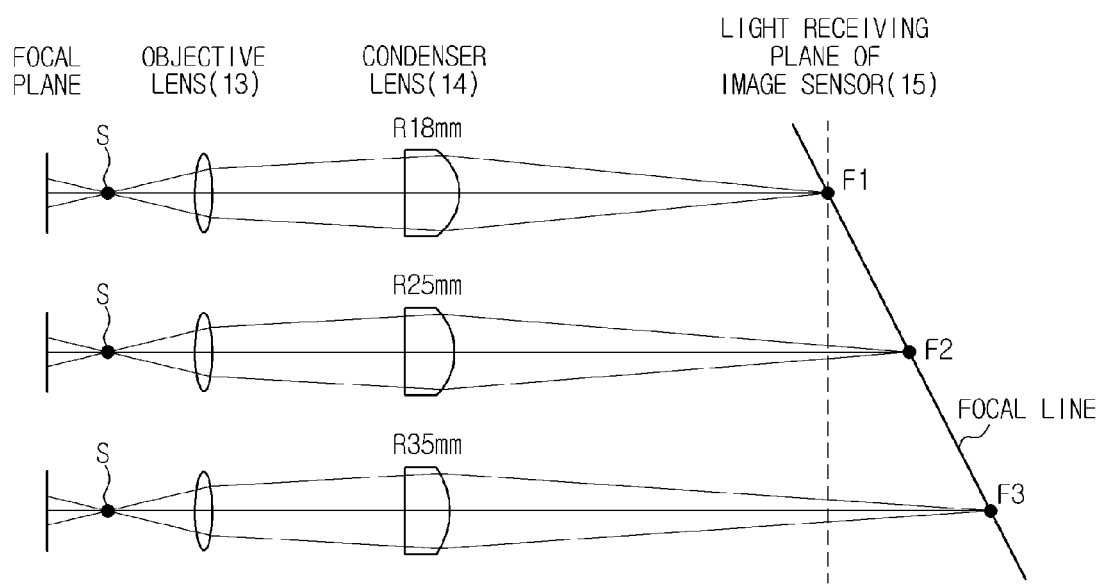
FIG. 3 is a view showing intensities of laser beams directed from three condenser lenses to an image sensor when a sample is located in front of a focal point of an objective lens in an autofocus control apparatus.

Also, FIG. 3 shows intensities of laser beams directed from three condenser lens sections to the image sensor when the sample is located in front of the focal point of the objective lens in an autofocus control apparatus.

Figure 4:
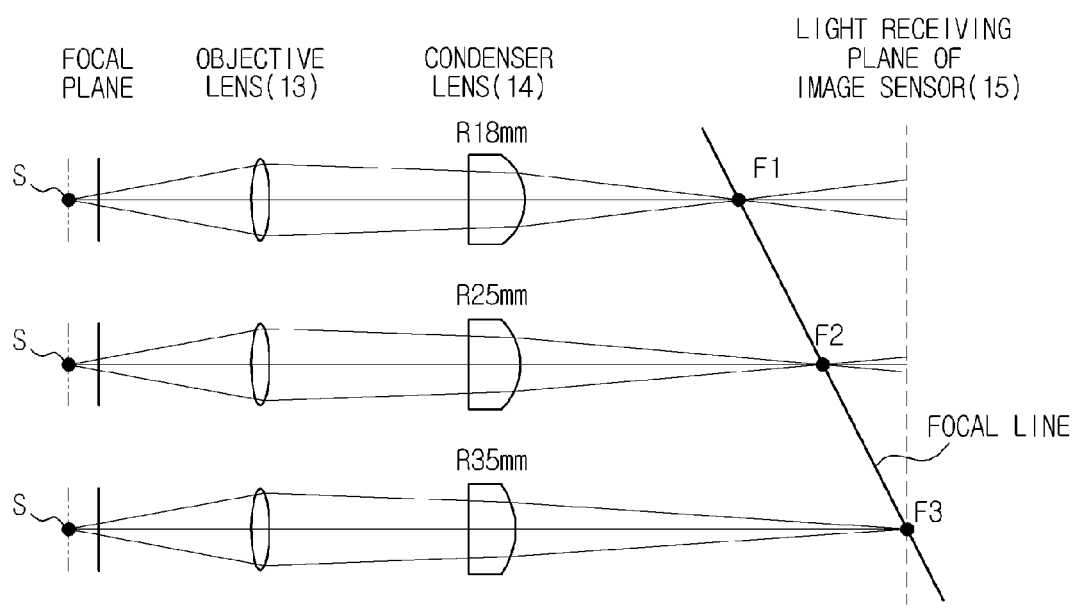
FIG. 4 is a view showing intensities of laser beams directed from three condenser lenses to an image sensor when a sample is located behind a focal point of an objective lens in an autofocus control apparatus.

Also, FIG. 4 shows intensities of laser beams directed from three condenser lens sections to the image sensor when the sample is located behind the focal point of the objective lens in an autofocus control apparatus. Each of these three figures will now be separately explained.

As illustrated in FIG. 2, the sample S is accurately located at a focal plane of the objective lens 13 and beams reflected from the sample S pass through the objective lens 13 and are introduced into the condenser lens section 14 having a radius of curvature of 18 mm. The laser beams emitted from the 18 mm condenser lens section 14 are condensed in front of the light receiving plane of the image sensor 15, rather than being condensed at the light receiving plane. That is, a focal point F1 of the condenser lens section having a radius of curvature of 18 mm is located in front of the light receiving plane of the image sensor 15.

Also, this figure shows that beams which are reflected from the sample S and pass through the objective lens 13 are introduced into the condenser lens section 14 having a radius of curvature of 25 mm. The laser beams emitted from the 25 mm condenser lens section 14 are condensed at the light receiving plane of the image sensor 15. That is, a focal point F2 of the condenser lens section having a radius of curvature of 25 mm is located at the light receiving plane of the image sensor 15.

Also, this figure shows that beams which are reflected from the sample S and pass through the objective lens 13 are introduced into the condenser lens section 14 having a radius of curvature of 35 mm. The laser beams emitted from the 35 mm condenser lens section 14 are condensed behind the light receiving plane of the image sensor 15, rather than being condensed at the light receiving plane. That is, a focal point F3 of the condenser lens having a radius of curvature of 35 mm is located behind the light receiving plane of the image sensor 15.

A focal line connecting the focal points F1, F2 and F3 of the three condenser lens sections having different radii of curvature intersects the light receiving plane of the image sensor 15. In this case, the intensity of the laser beam at the focal point F2 on the light receiving plane of the image sensor 15 is greater than intensities of the laser beams at the focal points F1 and F3.

As illustrated in FIG. 3, sample S is located in front of a focal plane of the objective lens 13 and the beams reflected from the sample S pass through the objective lens 13 and are introduced into the condenser lens section 14 having a radius of curvature of 18 mm. The laser beams emitted from the 18 mm condenser lens section 14 are condensed at the light receiving plane of the image sensor 15. That is, a focal point F1 of the condenser lens section having a radius of curvature of 18 mm is located at the light receiving plane of the image sensor 15.

This figure also shows that beams which are reflected from the sample S and pass through the objective lens 13 are introduced into the condenser lens section 14 having a radius of curvature of 25 mm. The laser beams emitted from the 25 mm condenser lens section 14 are condensed behind the light receiving plane of the image sensor 15. That is, a focal point F2 of the condenser lens section having a radius of curvature of 25 mm is located at the rear of the light receiving plane of the image sensor 15.

This figure also shows that beams which are reflected from the sample S and pass through the objective lens 13 are introduced into the condenser lens section 14 having a radius of curvature of 35 mm. The laser beams emitted from the 35 mm condenser lens section 14 are condensed behind the light receiving plane of the image sensor 15, rather than being condensed at the light receiving plane. That is, a focal point F3 of the condenser lens section having a radius of curvature of 35 mm is located behind the light receiving plane of the image sensor 15. The focal point F3 is located farther away from the light receiving plane than the focal point F2.

Similarly, a focal line connecting the focal points F1, F2 and F3 of the condenser lens sections having different radii of curvature intersects the light receiving plane of the image sensor 15. In this case, the intensity of the laser beam at the focal point F1 on the light receiving plane of the image sensor 15 is greater than intensities of the laser beams at the focal points F2 and F3.

As illustrated in FIG. 4, sample S is located behind the focal plane of the objective lens 13 and beams reflected from the sample S pass through the objective lens 13 and are introduced into the condenser lens section 14 having a radius of curvature of 18 mm. The laser beams emitted from the 18 mm condenser lens section 14 are condensed in front of the light receiving plane of the image sensor 15. That is, a focal point F1 of the condenser lens section having a radius of curvature of 18 mm is located in front of the light receiving plane of the image sensor 15.

This figure also shows that beams which are reflected from the sample S and pass through the objective lens 13 are introduced into the condenser lens section 14 having a radius of curvature of 25 mm. The laser beams emitted from the 25 mm condenser lens section 14 are condensed in front of the light receiving plane of the image sensor 15. That is, a focal point F2 of the condenser lens section having a radius of curvature of 25 mm is located in front of the light receiving plane of the image sensor 15 closer to the light receiving plane than the focal point F1.

This figure also shows that beams which are reflected from the sample S and pass through the objective lens 13 are introduced into the condenser lens section 14 having a radius of curvature of 35 mm. The laser beams emitted from the 35 mm condenser lens section 14 are condensed at the light receiving plane of the image sensor 15. That is, a focal point F3 of the condenser lens section having a radius of curvature of 35 mm is located at the light receiving plane of the image sensor 15.

Similarly, a focal line connecting the focal points F1, F2 and F3 of the condenser lens sections having different radii of curvature intersects the light receiving plane of the image sensor 15. In this case, the intensity of the laser beam at the focal point F3 on the light receiving plane of the image sensor 15 is greater than intensities of the laser beams at the focal points F1 and F2.

As described above, if the sample S is accurately located on the focal plane of the objective lens 13, a high-intensity signal is measured from the light receiving plane of the image sensor 15 only when the focal point of the condenser lens 14 coincides with the light receiving plane. Similarly, if the sample S is located in front of or behind the focal point of the objective lens 13, a high-intensity signal is measured from the light receiving plane of the image sensor 15 only when the focal point of the condenser lens 14 coincides with the light receiving plane. In summary, a current position of the sample S relative to the objective lens 13 may be recognized by measuring a position of the light receiving plane of the image sensor 15 where the high-intensity signal is measured.

In accordance with another embodiment, a condenser lens having a linearly varying radius of curvature may be used instead of three separate condenser lenses having different radii of curvature, in order to more rapidly and accurately recognize a position of the sample S relative to the objective lens 13. As an example, such a condenser lens may be a GFP lens having a linearly varying radius of curvature.

Figure 5:
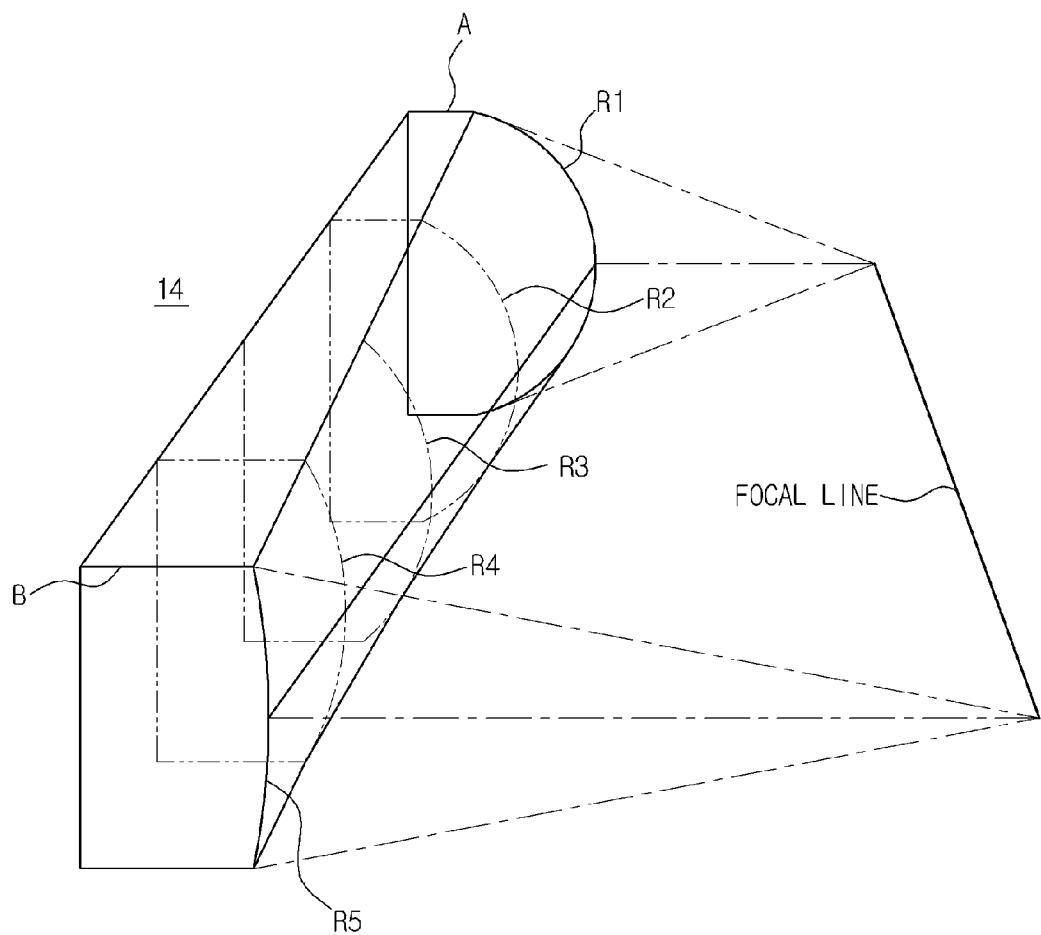
FIG. 5 is a perspective view of an example of a condenser lens that may be included in the autofocus control apparatus illustrated in FIG. 1.

FIG. 5 is a perspective view of a GFP condenser lens 14 which may be included in the autofocus control apparatus illustrated in FIG. 1. The condenser lens is constructed to include a plurality of condenser lens sections. As illustrated in FIG. 5, the condenser lens 14 has a first end A and a second end B having different radii of curvature to attain different focal distances. For example, a radius of curvature R1 of the first end A may be less than a radius of curvature R2 of the second end B. Furthermore, the radius of curvature may linearly decrease from the first end A to the second end B to define a linear gradient (R1<R2<R3<R4<R5).

In the lens of FIG. 5, a focal line connecting different focal points of the condenser lens 14 having different focal distances is a linear line. As described above, the condenser lens 14 and the image sensor 15 are arranged to ensure that the focal line intersects the light receiving plane of the image sensor 15.

Figure 6:
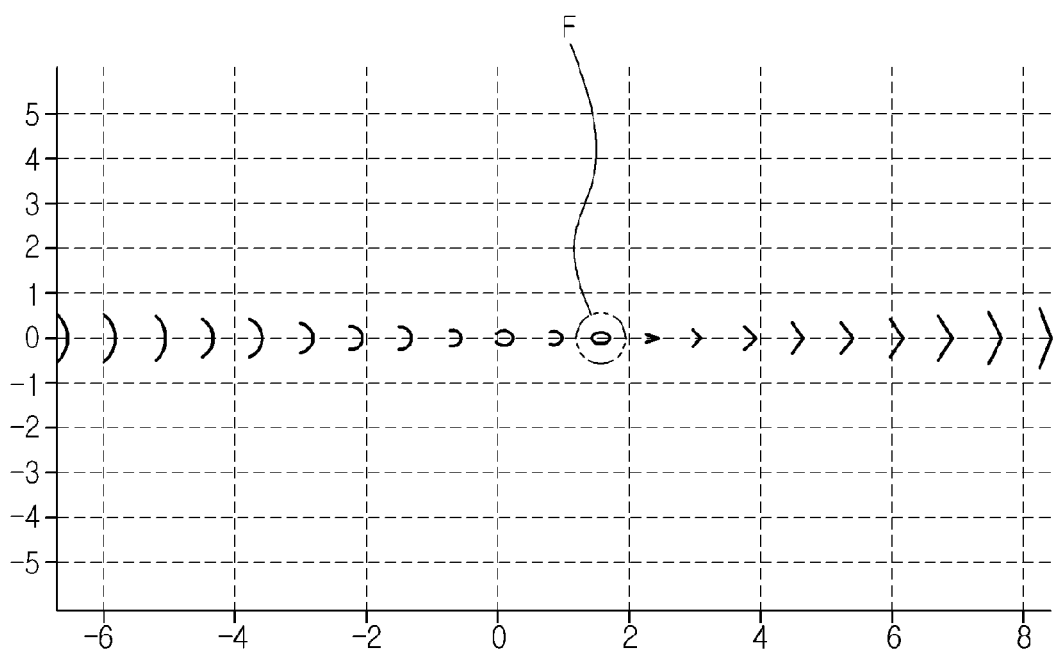
FIGS. 6 to 8 are views illustrating examples of image simulation results of the image sensor on a per distance basis between the sample and the objective lens in the autofocus control apparatus.
Figure 7:
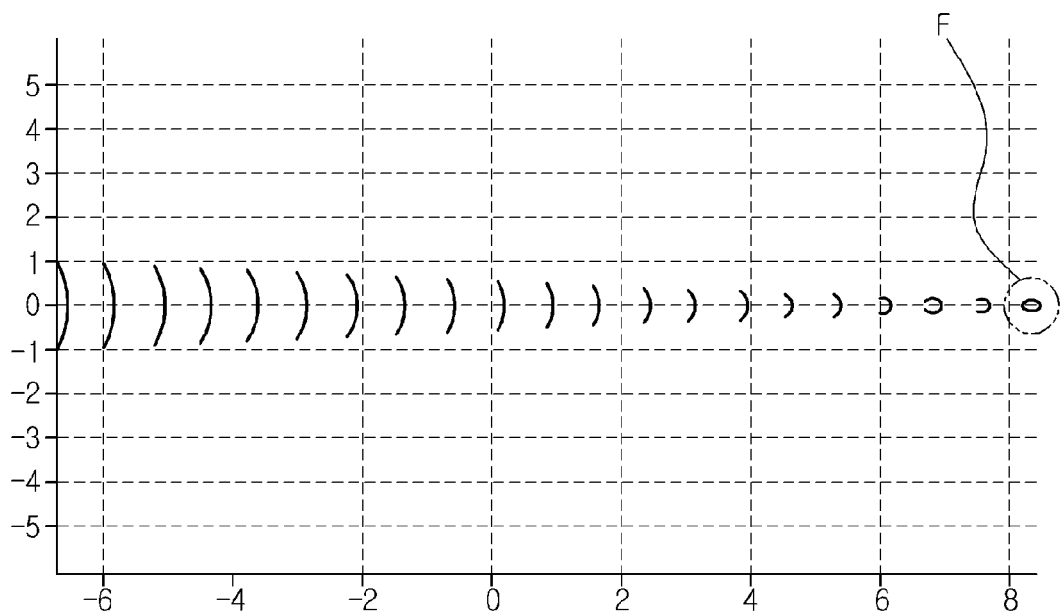
Figure 8:
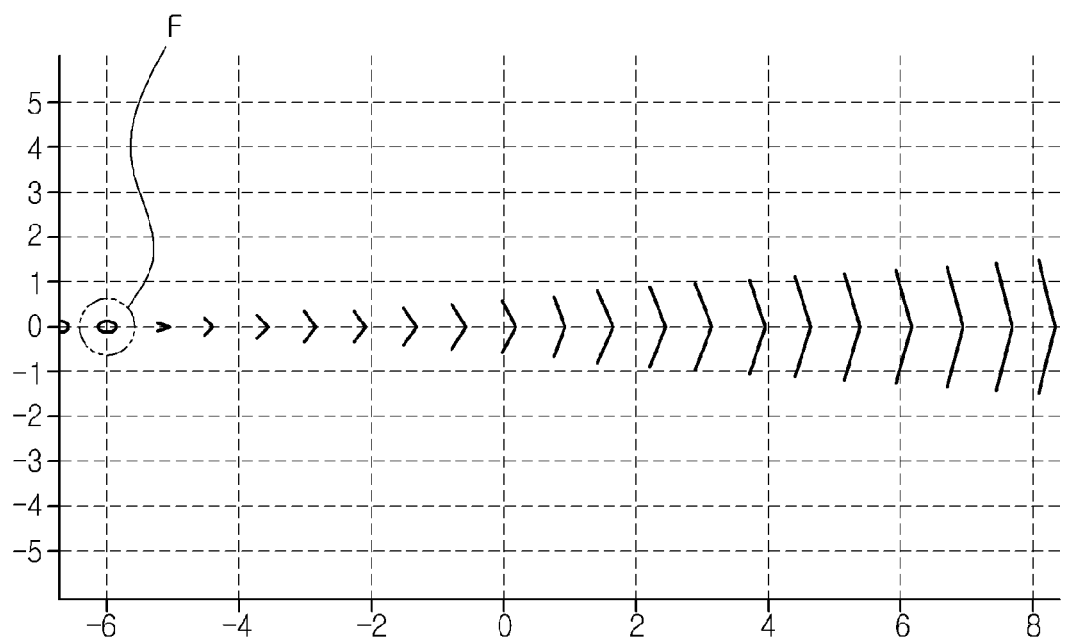

FIGS. 6 to 8 are views illustrating examples of image simulation results of the image sensor on a per distance basis between the sample and the objective lens in the autofocus control apparatus according to the embodiment of the present invention. As illustrated in FIGS. 6 to 8, a beam spot image on the light receiving plane of the image sensor 15 may be obtained as follows via mathematical modeling of the condenser lens having different focal distances.

First, FIG. 6 illustrates a beam spot image when a position of the sample S coincides with the focal plane of the objective lens 13. FIG. 7 illustrates a beam spot image when the sample S is located in front of the focal plane of the objective lens 13. And, FIG. 8 illustrates a beam spot image when the sample S is behind the focal plane. In FIGS. 6 to 8, "F" represents a focal point.

Also, as shown in FIG. 6, the different radii of curvature of condenser lens 14 causes a focal line connecting respective focal points of the condenser lens 14 to be slanted. Using condenser lens 14, focal point deviation between a position of the sample S and the focal point of the objective lens 13 may be determined via single image capture, which enables accurate recognition of the position of the sample S relative to the focal plane of the objective lens 13.

In alternative embodiments, the radius of curvature between ends A and B may vary non-linearly or according to another variation pattern. Also, while lens 14 is shown to have five radii of curvature, in other embodiments the lens may have a different number N of different curvature radii, where N≥2.

Figure 9:
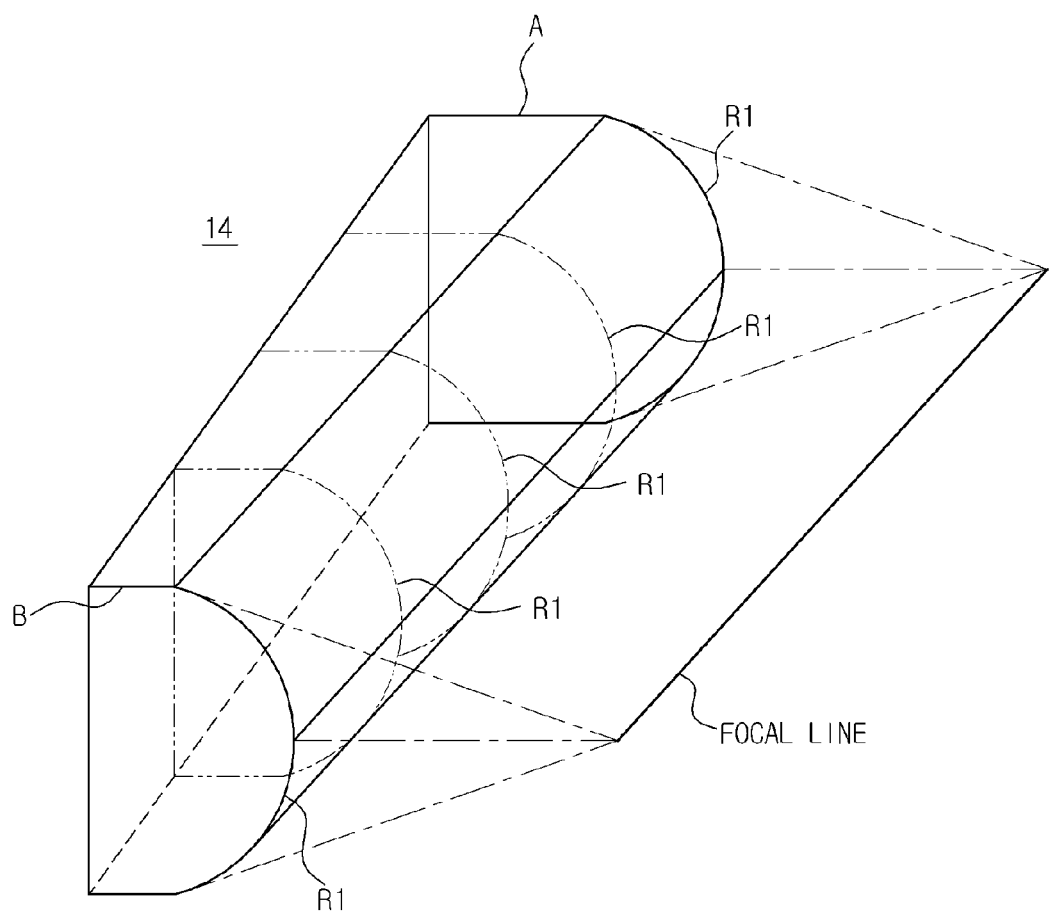
FIG. 9 is a perspective view of a condenser lens included in another embodiment of an autofocus control apparatus.

FIG. 9 is a perspective view of another embodiment of a condenser lens that may be included in an autofocus control apparatus. As illustrated in FIG. 9, a face of the condenser lens 14 extending between the first end and the second end of the condenser lens 14 has a constant radius. However, a thickness (e.g., a center thickness) of the lens may linearly vary to attain different focal distances.

That is, the face of the condenser lens 14 between the first end A and the second end B may have a constant radius of curvature R1, and a focal line connecting respective focal points of the condenser lens 14 may be a linear line. Also, in this embodiment, the condenser lens 14 and the image sensor 15 are arranged such that the focal line defined by the condenser lens 14 intersects the light receiving plane of the image sensor 15.

The condenser lens 14 having the above-described shape maintains a constant radius of curvature and linearly varies only in thickness thereof, and thus has effects similar to a GFP lens. Using this condenser lens, focal point deviation between a position of the sample S and the focal point of the objective lens 13 may be determined via single image capture, which enables accurate recognition of the position of the sample S relative to the focal plane of the objective lens 13.

Instead of replacing a GFP condenser lens with a cylinder or other lens having a constant focal distance, a relative angle between the condenser lens and a light receiving plane of an image sensor may be controlled to ensure that a focal line defined by the condenser lens intersects the light receiving plane.

Figure 10:
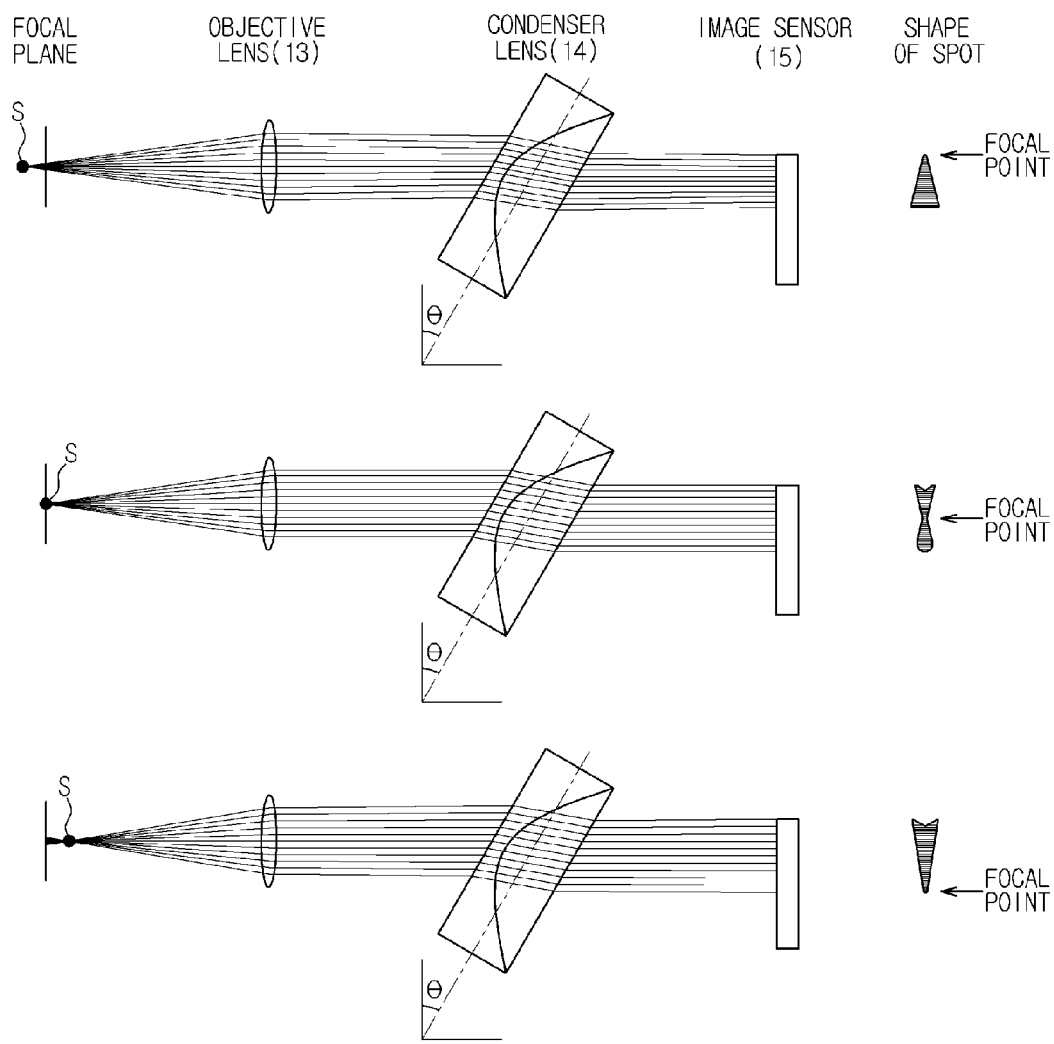
FIG. 10 is a view of another embodiment of an autofocus control apparatus in which a cylindrical condenser lens is tilted relative to a light receiving plane of an image sensor.

FIG. 10 is a view of another embodiment of an autofocus control apparatus in which a cylindrical condenser lens is tilted relative to a light receiving plane of an image sensor. As illustrated in FIG. 10, by using a lens (e.g., a cylindrical lens) having a constant focal distance as the condenser lens and titling the condenser lens relative to the light receiving plane of the image sensor 15, a focal line defined by the cylinder lens intersects the light receiving plane of the image sensor 15.

In this case, an angle between the focal line of the cylinder lens and the light receiving plane of the image sensor 15 has an absolute value greater than 0 degrees and less than 90 degrees. In accordance with one embodiment, the focal line of the condenser lens may not be arranged parallel or perpendicular to the light receiving plane of the image sensor 15.

Figure 11:
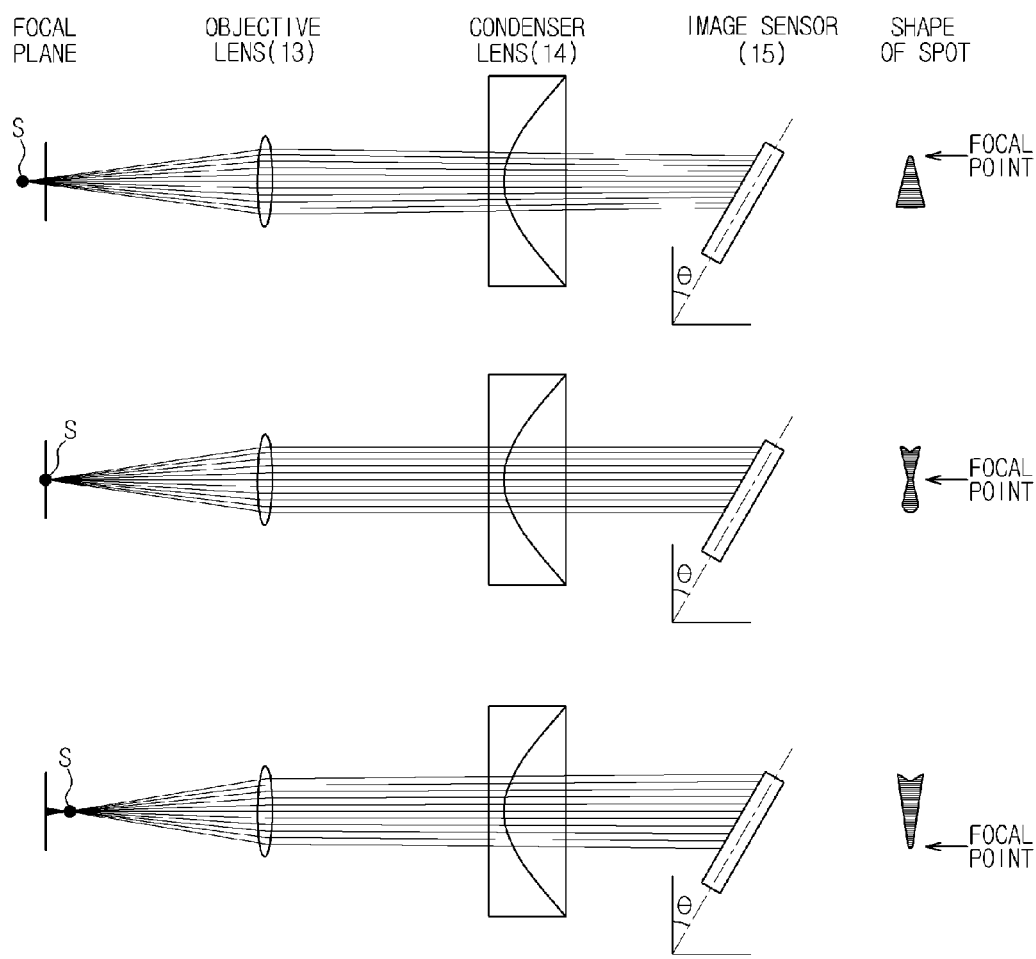
FIG. 11 is a view of another embodiment of an autofocus control apparatus in which a light receiving plane of an image sensor is tilted relative to a cylindrical condenser lens.

FIG. 11 is a view of another embodiment of an autofocus control apparatus in which a light receiving plane of an image sensor is tilted relative to a condenser lens, which, for example, may be a cylinder lens. As illustrated in FIG. 11, instead of using a condenser lens having a constant focal distance as the condenser lens 14, by titling the light receiving plane of the image sensor 15 relative to the cylinder lens, a focal line defined by the cylinder lens intersects the light receiving plane of the image sensor 15.

As described above, when the condenser lens 14 in the form of a GFP lens is replaced by a general cylinder lens, an angle between the cylinder lens and the light receiving plane of the image sensor 15 may be controlled to obtain effects of the GFP lens. To this end, the cylinder lens may be tilted or the light receiving plane of the image sensor 15 may be tilted. That is, a relative angle between the cylinder lens and the light receiving plane of the image sensor 15 may be controlled to determine variation of a focal point of the condenser lens. Hereinafter, detection of a sample image using two image sensors provided at different positions will be described.

Figure 12:
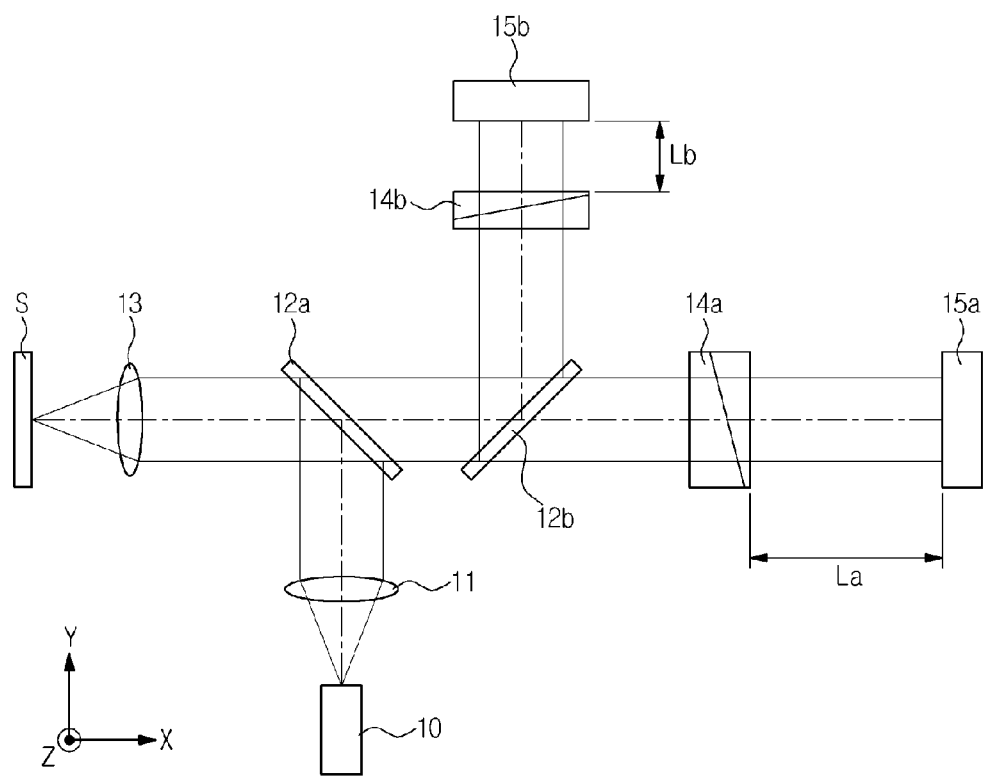
FIG. 12 is a schematic view of another embodiment of an autofocus control apparatus.

FIG. 12 is a schematic view illustrating an embodiment of a configuration of an autofocus control apparatus in which an autofocus control range is determined based on designs with respect to a focal distance of a GFP lens.

In this embodiment, a dual configuration of a GFP lens and an image sensor is used to expand the limited range and a laser beam is divided into two beams by a second beam splitter 12b before passing through a first condenser lens 14a. The divided laser beams pass through first and second condenser lenses 14a and 14b having different focal distances, which may result in an expanded management range. Additionally, using a multistage beam splitter enables a flexible adjustment of the management range.

More particularly, in addition to the light source 10, the first beam splitter 12a and the objective lens 13, the autofocus control apparatus of the present embodiment includes the second beam splitter 12b that transmits some of the beams and reflects some of the beams that have been reflected from the sample S and passed through the first beam splitter 12a.

The autofocus control apparatus further includes the first condenser lens 14a and a first image sensor 15a into which the beams divided by the second beam splitter 12b are introduced. The first condenser lens 14a and the first image sensor 15a constitute a first focal point deviation detector in conjunction with the controller that performs a general control operation.

The first focal point deviation detector detects focal point deviation of the sample S relative to the focal point of the objective lens 13. The first focal point deviation detector detects focal point deviation based on a first beam spot image defined as a first focal line connecting focal points of the first condenser lens 14a, into which the beams having passed through the second beam splitter 12b are introduced. This focal line intersects a light receiving plane of the first image sensor 15a into which the beams emitted from the first condenser lens 14a are introduced.

The autofocus control apparatus also includes the second condenser lens 14b and a second image sensor 15b, into which the beams divided by the second beam splitter 12b are introduced. The second condenser lens 14b and the second image sensor 15b constitute a second focal point deviation detector in conjunction with the controller that performs a general control operation.

The second focal point deviation detector detects focal point deviation of the sample S relative to the focal point of the objective lens 13. The second focal point deviation detector detects focal point deviation based on a second beam spot image defined as a second focal line connecting focal points of the second condenser lens 14b, into which the beams reflected by the second beam splitter 12b are introduced. The second focal line intersects a light receiving plane of the second image sensor 15b into which the beams emitted from the second condenser lens 14b are introduced.

In this case, assuming that a distance between the first condenser lens 14a and the first image sensor 15a is La and a distance between the second condenser lens 14b and the second image sensor 15b is Lb, La and Lb may be equal to each other, but may differ from each other. Providing different La and Lb may allow a user to select a desired sample focus measurement range, which results in an expanded measurement environment.

Although FIG. 12 explains a configuration in which the first and second condenser lenses 14a and 14b are GFP lenses, alternatively at least one of the two lenses may be a GFP lens and the other lens may be a general cylinder lens. Additionally, or alternatively, any one of the cylinder lens and a corresponding image sensor may be tilted relative to an optical axis to ensure that a focal line of the cylinder lens intersects a light receiving plane of the corresponding image sensor.

In another embodiment, both the first condenser lens 14a and the second condenser lens 14b may be cylinder lenses. In this case, any one of the cylinder lens and a corresponding image sensor may be tilted relative to an optical axis to ensure that a focal line of the cylinder lens intersects a light receiving plane of the corresponding image sensor.

In accordance with one or more embodiments, in order to find a focal point via single image capture using an image sensor, an autofocus control apparatus is configured such that a focal plane connecting focal points of a condenser lens intersects a light receiving plane of the image sensor, thereby performing faster and more accurate autofocus control than conventional positive and passive autofocus control apparatuses.

According to another embodiment, an autofocus control apparatus is provided which finds an accurate focal point via single image capture, which enables faster driving of the apparatus and very accurate detection of a focal point based on characteristics of a GFP lens.

Also, in accordance with one or more of the foregoing embodiments, an autofocus control apparatus may be provided which has both increased speed and accuracy.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An autofocus control apparatus comprising:
   a light source;
   a beam splitter configured to direct light beams from the light source toward a sample and to pass light beams reflected from the sample;
   a condenser lens configured to condense the light beams reflected from the sample and passing through the beam splitter; and
   a focal point deviation detector including an image sensor and configured to detect a focal point deviation of the sample relative to a focal point of the condenser lens, the focal point deviation detector configured to detect the focal point deviation based on an intersection of a focal line passing through different focal points of the condenser lens with a light receiving plane of the image sensor configured to receive the light beams passing through the condenser lens.

2. The apparatus according to claim 1, wherein the focal point deviation detector includes the condenser lens.

3. The apparatus according to claim 1, wherein the focal line of the condenser lens intersects the light receiving plane of the image sensor at an angle different from a right angle.

4. The apparatus according to claim 3, wherein the condenser lens has
   different focal distances corresponding to the different focal points, and
   a light beam emission face having a linearly varying radius of curvature which causes the focal line of the condenser lens to intersect the light receiving plane of the image sensor.

5. The apparatus according to claim 1, wherein
   the condenser lens includes a first section and a second section having different radii of curvature, and
   a radius of curvature of the condenser lens linearly decreases or increases from one end of the condenser lens to the other.

6. The apparatus according to claim 1, wherein
   the condenser lens includes a first section and a second section having substantially a same radius of curvature, and
   a thickness of the condenser lens linearly decreases or increases from one end of the condenser lens to the other.

7. The apparatus according to claim 1, wherein
   the condenser lens includes a cylinder lens having a substantially constant focal distance, and
   the cylinder lens is tilted relative to an optical axis to cause the focal line passing through the different focal points of the cylinder lens to intersect the light receiving plane.

8. The apparatus according to claim 1, wherein
   the focal point deviation detector includes an image sensor which is tilted at an angle relative to an optical axis, and
   the angle allows the light receiving plane to intersect the focal line of the condenser lens.

9. The apparatus according to claim 1, further comprising:
   a controller configured to generate a beam spot image from image data detected by the focal point deviation detector, the controller configured to determine a degree of the focal point deviation based on the focal point of the condenser and a reference position.

10. The apparatus according to claim 9, wherein the controller is configured to determine the focal point of the condenser lens based on intensities of light beams in the beam spot image.

11. The apparatus according to claim 9, wherein
   the focal point deviation detector includes a stage mover to move a stage supporting the sample, and
   the controller is configured to control the stage mover to move the stage based on the degree of focal point deviation, the stage mover moving the sample to a position that at least substantially coincides with the focal point of the condenser lens.

12. An autofocus control apparatus comprising:
   a light source;
   a first beam splitter configured to direct light beams from the light source toward a sample and to pass light beams reflected from the sample;
   a second beam splitter configured to transmit a first portion of the light beams reflected from the sample and passed through the first beam splitter and to reflect a second portion of the light beams;
   a first condenser lens configured to condense the first portion of the light beams reflected from the sample and passing through the first beam splitter and the second beam splitter;

a second condenser lens configured to condense the second portion of the light beams reflected from the sample and passing through the first beam splitter and reflected from the second beam splitter;

a first focal point deviation detector configured to receive the first portion of the light beams from the first condenser lens and to detect a first focal point deviation of the sample based on an intersection of a first focal line passing through different focal points of the first condenser lens with a first light receiving plane; and a second focal point deviation detector configured to receive the second portion of light beams from the second condenser lens and to detect a second focal point deviation of the sample based on an intersection of a second focal line passing through different focal points of the second condenser lens with a second light receiving plane.

13. The apparatus according to claim 12, wherein the second condenser lens has different focal distances and includes a light beam emission face having a linearly varying radius of curvature to cause the second focal line to intersect the second light receiving plane.

14. The apparatus according to claim 12, wherein the second condenser lens has different focal distances and includes a light beam emission face having a substantially constant radius of curvature to cause the second focal line to intersect the second light receiving plane.

15. The apparatus according claim 14, wherein the second condenser lens has different thicknesses corresponding to the different focal distances.

16. An apparatus comprising:
a first lens configured to condense light beams; and
a detector configured to detect an intersection between a focal line and a light receiving plane, the first lens including a plurality of focal points of different lengths through which the focal line passes and the detector configured to detect a focal point deviation of an object from which the light beams reflect based on the intersection of the focal line with the light receiving plane.

17. The apparatus according to claim 16, wherein the first lens has
a first section with a first focal point,
a second section with a second focal point different from the first focal point, and
the focal line passing through the first and second focal points is slanted to cause the focal line to intersect the light receiving plane at only one point.

18. The apparatus according to claim 17, wherein the first focal point and the second focal point are simultaneously generated on the focal line.

19. The apparatus according to claim 16, wherein the first lens has
a light emitting surface with different radii of curvature, and
the different radii of curvature corresponding to respective ones of the different focal points.

20. The apparatus according to claim 16, wherein the first lens has
a light emitting surface with a substantially constant radius of curvature, and
sections with different thicknesses coupled to the light emitting surface corresponding to respective ones of the different focal points.

* * * * *